US010050912B2

(12) United States Patent
Siegel et al.

(10) Patent No.: US 10,050,912 B2
(45) Date of Patent: Aug. 14, 2018

(54) SUBSCRIPTION-BASED MEDIA PUSH SERVICE

(71) Applicant: AT&T Intellectual Property I, LP, Atlanta, GA (US)

(72) Inventors: Steven A. Siegel, Mendham, NJ (US); Mark Jeffrey Foladare, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 904 days.

(21) Appl. No.: 14/524,237

(22) Filed: Oct. 27, 2014

(65) Prior Publication Data
US 2016/0119262 A1   Apr. 28, 2016

(51) Int. Cl.
*H04L 12/58* (2006.01)
*H04L 12/18* (2006.01)

(52) U.S. Cl.
CPC ........ *H04L 51/066* (2013.01); *H04L 12/1859* (2013.01); *H04L 51/14* (2013.01)

(58) Field of Classification Search
CPC ... H04L 51/066; H04L 12/1859; H04L 51/14; H04L 29/06448; H04L 65/00; H04L 65/4069; H04L 51/06; G06F 17/30516; G06F 17/3089; H04N 7/173; H04N 7/03; H04N 7/0888; H04N 7/162; H04N 7/167; H04N 21/00; H04N 67/1076
USPC ...................................................... 709/206
See application file for complete search history.

(56) References Cited

U.S. PATENT DOCUMENTS

| 5,956,482 | A | 9/1999 | Agraharam et al. |
| 6,230,205 | B1 | 5/2001 | Garrity et al. |
| 6,594,682 | B2 | 7/2003 | Peterson et al. |
| 7,284,201 | B2 | 10/2007 | Cohen-Solal |
| 7,460,860 | B2 * | 12/2008 | Sherman ................ H04L 41/18 455/412.2 |

(Continued)

FOREIGN PATENT DOCUMENTS

| EP | 2744168 A1 | 6/2014 |
| JP | 2011147025 A | 7/2011 |

(Continued)

OTHER PUBLICATIONS

Gerwig, "The Push Technology Rage . . . So Wht's Next?", 1997.*

(Continued)

*Primary Examiner* — O. C. Vostal
(74) *Attorney, Agent, or Firm* — Guntin & Gust, PLC; Joseph Hrutka

(57) ABSTRACT

Aspects of the subject disclosure may include, for example, a process that determines an identity of a subscriber of a media service. A viewing criterion of the subscriber is determined and a media content item is identified based on the viewing criterion of the subscriber. The media content item is provided for delivery to a media processing device without first requiring a request for delivery of the media content item. The media processing device is identified by a network service provider based on a selection of the media processing device from among a number of devices of the subscriber that are registered with the network service provider. The selection of the media processing device is based on device capabilities and the identity of the subscriber. Other embodiments are disclosed.

20 Claims, 9 Drawing Sheets

(56) References Cited

U.S. PATENT DOCUMENTS

| | | | | |
|---|---|---|---|---|
| 7,953,808 B2* | 5/2011 | Sharp | ............... | H04L 51/24 709/206 |
| 8,064,896 B2* | 11/2011 | Bell | ............... | H04L 12/1859 370/312 |
| 8,122,098 B1* | 2/2012 | Richardson | ........ | H04L 61/1511 709/217 |
| 8,244,822 B1* | 8/2012 | Lowry | ............... | H04L 67/26 709/202 |
| 8,429,702 B2 | 4/2013 | Yasrebi et al. | | |
| 8,447,831 B1* | 5/2013 | Sivasubramanian | ............... | H04L 61/1511 709/216 |
| 8,601,049 B2* | 12/2013 | Mendonca | ............... | G06Q 10/107 709/203 |
| 8,799,973 B2 | 8/2014 | Yasrebi et al. | | |
| 8,924,489 B2* | 12/2014 | Bleau | ............... | H04L 67/26 709/206 |
| 9,078,128 B2* | 7/2015 | Medina | ............... | H04L 63/0807 |
| 9,672,533 B1* | 6/2017 | Lattyak | ............... | G06Q 30/0269 |
| 2002/0107985 A1* | 8/2002 | Hwang | ............... | G06F 17/30905 709/246 |
| 2005/0138192 A1* | 6/2005 | Encarnacion | ....... | H04L 12/2812 709/230 |
| 2007/0105589 A1* | 5/2007 | Lu | ............... | H04W 88/02 455/556.2 |
| 2007/0118603 A1* | 5/2007 | Washburn | ............... | G06Q 10/10 709/206 |
| 2007/0244750 A1* | 10/2007 | Grannan | ............... | G06Q 30/02 705/14.64 |
| 2009/0063293 A1* | 3/2009 | Mirrashidi | ........ | G06Q 30/0621 705/26.5 |
| 2009/0163183 A1* | 6/2009 | O'Donoghue | ........ | G06Q 30/02 455/414.1 |
| 2009/0210904 A1 | 8/2009 | Baron et al. | | |
| 2011/0300832 A1* | 12/2011 | Shaw | ............... | H04L 51/38 455/412.1 |
| 2012/0150970 A1* | 6/2012 | Peterson | ............ | G06F 3/04817 709/206 |
| 2012/0240176 A1* | 9/2012 | Ma | ............... | H04N 21/23439 725/114 |
| 2012/0275444 A1 | 11/2012 | Shahsavari | | |
| 2013/0110613 A1* | 5/2013 | Covert | ............... | G06Q 30/01 705/14.39 |
| 2013/0117382 A1* | 5/2013 | Gaddam | ............... | H04L 67/26 709/206 |
| 2013/0238472 A1* | 9/2013 | Fan | ............... | G06Q 30/04 705/34 |
| 2013/0339519 A1 | 12/2013 | Lientz | | |
| 2014/0280498 A1* | 9/2014 | Frankel | ............... | H04W 4/206 709/203 |
| 2014/0281007 A1* | 9/2014 | Lemmons | ............ | H04N 21/2355 709/231 |
| 2014/0365569 A1* | 12/2014 | Vyrros | ............... | H04W 4/12 709/204 |
| 2015/0263977 A1* | 9/2015 | Nair | ............... | H04L 47/70 709/226 |

FOREIGN PATENT DOCUMENTS

| | | |
|---|---|---|
| KR | 2010125561 | 12/2010 |
| WO | 2013116129 A1 | 8/2013 |
| WO | 2014040560 A1 | 3/2014 |

OTHER PUBLICATIONS

MacMillian Dictionary, "Push technology", 2009-2017.*
Quaddor, "WAP and Push Technology Integrated into Mobile Commerce Applications", 2006.*
Quah et al., "Push selling—Multicast messages to wireless devices based on the publish/subscribe model", 2002.*
Sharpened Productions, "Push", 2008.*
Technopedia, "Push Technology", 2017.*
Umbach, "What is 'Push Technology' ? ", 1997.*
UniAssignment.com, "Types of Push Technology Information Technology Essay", 2017.*
W3C, "W3C Push Workshop", 1997.*
Wikipedia, "Push technology", 2017.*
Roy, "Push messages that automatically launch a Java mobile application", 2006.*
Technopedia, "Network Service Provider (NSP)", 2018.*
Wikipedia, "Network service provider", 2018.*

* cited by examiner

300A

300B

400A

400B

SUBSCRIPTION-BASED MEDIA PUSH SERVICE

FIELD OF THE DISCLOSURE

The subject disclosure relates to a subscription-based media push service.

BACKGROUND

Although it is possible to invite people to media presentations of live events as they happen, it is a tedious process requiring that one first know who to invite followed by sending to those individuals, invitations to the presentation of the live event all the while hoping that maybe they receive the message in time to experience the event as it occurs. Consider the task of setting up a video conference call, on the fly, from a video conference device. In addition to being tedious and somewhat risky, it is also restrictive as to the devices used.

Push services are currently available whereby clients on a user device receive content that is distributed from a server. Distribution in this manner is referred to as a push, because the server pushes that information out to the client whenever new content is available on one of those channels. The client generally "subscribes" to information channels offered by the server. Indeed, many people subscribe to real-time alerts for sports, news or stocks. Some examples of push services include online chat messaging systems, online gaming, market data distribution, and in some instances email.

In the client-server scenarios, the server is aware of the client's identity and particularly the client's network address. In this manner, the server is able to push content at will and without delay. The client can identify itself to the server, e.g., during a registration process during which it can provide its identity and address.

BRIEF DESCRIPTION OF THE DRAWINGS

Reference will now be made to the accompanying drawings, which are not necessarily drawn to scale, and wherein.

DETAILED DESCRIPTION

Figure 1:
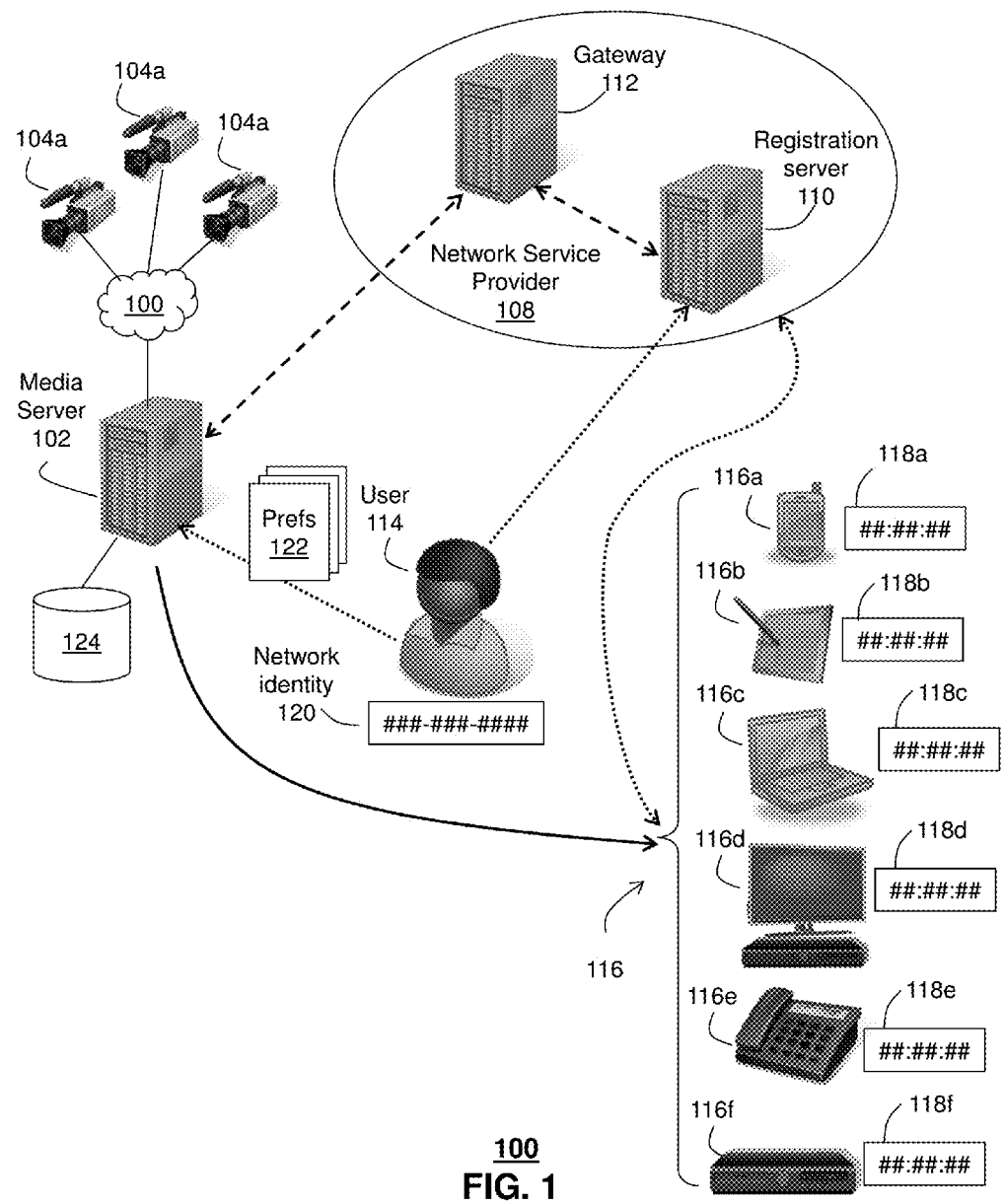
FIG. 1 depicts an illustrative embodiment of a system that delivers media content to user devices, without first having received a request for the media content.

The subject disclosure describes, among other things, illustrative embodiments of a subscription-based, media push service. The media push services disclosed herein can be used to direct, forward, or otherwise deliver media content, such as live media content, to the user, without first requiring or otherwise receiving a request from the user. Such non-request based delivery can be beneficial when the exact time and/or duration of such events may be unknown or otherwise vary based on a number of reasons, such as completion of preceding games, weather delays, and so on. In some instances, the availability of a media content item may be completely unexpected, as in an occurrence of a live media broadcast of a breaking news event. The media push service, the "service," finds media content items associated with a particular interest or other criteria identified by a subscriber to the service. The user may also have a particular interest for which the user wants media (e.g., video) streamed live. The service also identifies a network location of a destination device by which the user can receive the media content item. This destination device can include one or more devices of the user that are suitable to receive the media content item. Alternatively or in addition, the destination device can include an intermediary device, such as a distribution server or gateway, by which the media content item can be obtained by or otherwise pushed to the suitable end-user device(s).

In more detail, the service allows a user to register with an independent, e.g., universal registrar for one or more services to route one of voice, text, video communications or combinations thereof. The registration indicates for each endpoint whether or not it can support the service and whether it has a proper client. The user subscribes to a subscription-based, delivery service based on a user identifier and not necessarily on an equipment identifier or network address. The service monitors media content, for example, by monitoring the metadata of media content on various media content sources or services, identifying those feeds that meet the subscriber's criteria. The service then sends a request to a network service provider to allow the service to connect to one or more devices of the user. The network service provider uses a registrar to determine which endpoints of the user (devices, clients) are currently registered and are capable of supporting the service (e.g., rendering video). The client is notified and with or without customer acceptance (service parameters) the live media (video) can be streamed to the user device.

The media services provider can have access to capabilities that identify one or more of a description of the media content item, the author, director, cast, genre, source, potential/intended audience (e.g., children), format of the material, and so on. Such information, such as the description of the media content item and/or potential audience can be compared, correlated or otherwise mapped to information maintained in a user registrar of the media services provider to determine if this content is identified as potential content to deliver to a particular end user or group of end users.

Using User defined Cloud technology, the ability to identify user populations and well placed upcoming broadcast technologies (e.g., eMBMS) and the proper use of identifying publisher, content, and receiver, we can most efficiently and effectively deliver pin-pointed content from the source to the receiver in real time cost effectively while optimally using network resources.

One or more aspects of the subject disclosure include a subscription service where the user indicates under which conditions (personal status and topic of interest) he/she may want to be interrupted with live video (e.g., news topics or other tags). Other end-user preferences can include one or more of identification of user devices, capabilities and/or features of the devices, priorities or preferences among the devices, e.g., choosing among devices when more than one capable devices are available to avoid/minimize cellular data charges and so on. The user selects from a searchable list to create a profile of subject areas that he/she would want to receive live updates. The content provider, e.g., ABC News, may also subscribe to have the content publishable to a particular type of user. The service will monitor for material on those topics from either various sources or a specific selection of sources. When material is available, it will find the user on any combination of capable devices from which the user has registered (e.g., TV, cell phone, tablet, computer). It will send an alert to a client on the device that can indicate to the user that there is live material "breaking news" If the user accepts (optionally automatic if the user so chooses), and if necessary, selects the device for receipt, the client can, depending on user preferences, either break into current activity (e.g., broadcast TV, application) or open a separate window for the new live content. This could be a consumer service or an enterprise service.

It is worth noting here that reference to live media content items, such as live video and the like, can refer to a media broadcast of a live event occurring substantially contemporaneously with the occurrence of the live event. Some delays might be allowed for censuring, network distribution, delay and so forth. Live media can also refer to media that is previously unscheduled. That is, the presentation of the media occurring at a previously unknown or undetermined time, in an unexpected manner, unannounced, and so on.

It is envisioned that, in at least some embodiments, one or more user devices identified for receiving the media content item(s) may not be active or otherwise available to receive the item at the time of its availability. Consider a situation in which all of a user's devices are turned off. In such circumstances, a signal can be sent to one or more of the user devices to activate the device(s) thereby allowing the device (s) to receive the item for storage and/or presentation.

By way of example, a media processor or set-top box can have ac power applied to it, while being in a "power off" state. The set-top box can include circuitry that monitors for command signals while in the power off state. Upon receiving a suitable command, the set-top box powers on, receives the media content item and presents it to a media display device.

More generally, any network accessible device can be configured for remote activation, allowing the device to be turned on to receive, to record and/or to otherwise present a media content item being pushed to the device. To this end, other monitoring devices, not necessarily those intended for receiving or otherwise presenting the media content item, can be used to monitor for the availability of such media content items. Upon detecting the availability of a media content item, the monitoring devices can provide a signal(s) to activate other user device(s). The monitoring devices can include remote devices of the user, e.g., a device in a user's car or pocket that can be used to signal activation of the user's home entertainment system. It is also envisioned that such monitoring and activation services can be provided by another entity, such as the network service provider or an unrelated monitoring service provider.

One embodiment of the subject disclosure includes a system, including a processor and a memory that stores executable instructions that, when executed by the processor, facilitate performance of operations including determining an identity of a user of a media service. The operations further include determining a media consumption criterion of the user, identifying a media content item based on the media consumption criterion, and obtaining a network address from a network service provider. The network address is identified by the network service provider based on an identity of the user and a selection of a device from among multiple devices of the user resulting in a selected device. The multiple devices are pre-registered with the network service provider in association with the user and the selection of the device is based on device capabilities. The media content item is provided to the network address without requiring a request from the multiple devices of the user, wherein the selected device obtains the media content item by way of the network address for presentation by equipment of the user.

Another embodiment of the subject disclosure includes a process that determines an identity of a subscriber of a media service. A viewing criterion of the subscriber is determined and a media content item is identified based on the viewing criterion of the subscriber. The media content item is provided for delivery to a media processing device without first requiring a request for delivery of the media content item. The media processing device is identified by a network service provider based on a selection of the media processing device from among a number of devices of the subscriber that are registered with the network service provider. The selection of the media processing device is based on device capabilities and the identity of the subscriber.

Yet another embodiment of the subject disclosure includes a machine-readable storage medium, including executable instructions that, when executed by a processor, facilitate performance of operations. The operations include obtaining a criterion of a user and determining an availability of media content occurring at an unscheduled time based on the criterion of the user. A network address is obtained, based on a network identity of the user, to which the previously unscheduled media content is provided. The network address is obtained from a network service provider based on selection of a device from among a number of devices of the user, the number of devices having been registered with the network service provider. The selection of the device results in a selected device based on device capabilities and the identity of the user. The media content is provided to the network address without requiring a request from the plurality of devices, wherein the selected device obtains the previously unscheduled media content by way of the network address.

FIG. 1 depicts an illustrative embodiment of a system 100 that delivers media content to media processing devices, without first having received a request for the media content. Such delivery of media content initiated by a publisher or broadcast source, including the media service provider, can be referred to generally as push service. The system includes a media server 102 communicatively coupled to one or more media content sources 104a, 104b, 104c (generally 104). In the illustrative example, the media server 102 accesses media content and/or descriptors of media content from the media content sources 104 over a wide area network 106, such as the Internet. The media content sources 104 can include network broadcast services, cable channels, radio broadcast services, satellite broadcast services, social media services, and so on, that generally publish or otherwise make media content available in various forms.

The system 100 further includes a network service provider 108, or other registration service provider, having a registration server 110 and a network services gateway 112. Also shown is a user 114 of the system along with examples of media processing equipment of the user. It should be understood that the techniques disclosed herein can be applied to individual users, to small groups of related users and to vast groups, such as the public at large. The user equipment includes, without limitation, a mobile phone 116a (simple cell phone or smart phone), a tablet device 116b, a personal computer, such as a laptop computer 116c, a media processor, or set-top box and television 116d, telephone 116e, such as a VoIP telephone, or a traditional telephone, and a recording device 116f, such as a hard disk drive, a magnetic tape recorder, an optical disk recorder, a flash memory device, and/or a cloud storage service. The various devices 116a, 116b, 116c, 116d, 116e, 116f are referred to generally as media processing equipment 116, or user devices 116.

In the illustrative example, the user 114 initially subscribes to a media push service that delivers media content by way of the media server 102. By subscribing to the service, the user 114 provides the media server 102 with some form of identification, such as a network services identifier 120, e.g., a telephone number, associated with the user. The network service identifier 120 can serve as a user identifier to identify an individual, rather than a particular media processing device 116. It is conceivable that one telephone number, such as a land line, could be associated with multiple users, such as members of a family. To allow for individualized identification in such situations, an additional identifier, such as an extension can be added, appended or otherwise associated with the network services identifier (telephone number) 120 can be used. It is worth noting here that the user 114 need not provide any information to the media service provider that is related to user devices 116, device capabilities, network addresses, and so on.

The user 114 also provides the media service provider with one or more parameters 122 related to the delivery of media content. In the illustrative example, the user 114 provides the media server 102 with parameters 122, which the media server retains in a storage device 124. The parameters 122 can be retained in a user account and/or user profile associated with the user 114. The dotted line between the user 114 and the media server 102 signifies an information channel that can be used during a pre-configuration and/or revision of a previously established configuration. It is conceivable that the parameters can be selected, updated, deleted or otherwise monitored by the user 114 in order to maintain the user's subscription in an up-to-date manner to account for changing user tastes, events, schedules, cost, and so on. The user can provide and/or otherwise maintain the parameters 122 in any manner suitable for exchanging such information. Such parameters can be provided, without limitation, by an IP service, e.g., through an Internet portal or HTML page, via telephone (voice and/or dual-tone-multiple-frequency modulation), via text (SMS) message, via letters, e.g., filling out a paper form, and so on.

The network service provider 108 can include one or more of Internet services providers, telecommunication network services providers, mobile carriers, satellite services providers, cable network service providers, and so on. It is also conceivable that, although a single network service provider 108 is shown, more than one such provider can provide network services to the same user 114. By way of example, the user 114 can purchase internet services and televisions services, including video on demand, from a single network service provider, e.g., as a bundled service plan. The same user may purchase mobile services from a different service provider.

The user 114 can be in communication with equipment of the network services provider 108 to convey information. A first dotted line is shown interconnecting the user devices 116 and the network service provider 108. This interconnecting line can represent communication connectivity either directly to resources of the network service provider 108 and/or by way of one or more intervening networks. A second dotted line is also shown interconnecting the user 114 and the registration server 110 of the network service provider 108. The user 114 can register for services with the network service provider 108, for example, by signing up for a service plan. A user identification, such as a network service identifier 120 can be assigned or otherwise associated with the user 114 during a subscription process with the network service provider 108. The network service identifier 120 can include any suitable address for identifying the user 114, such as a telephone number. The user 114 can register any or all of the available media processing devices 116 at the user's disposal. Each of the user devices 116 can have an associated identifier 118a, 118b, 118c, 118d, 118e, 118f (generally 118). The device identifier 118 can include one or more of a device identification number (e.g., EIN, SIM), an address, such as a MAC address and/or an IP address. Alternatively or in addition, the devices 116 can include one or more applications, sometimes referred to as clients, that can include associated identifiers 118, such as IP addresses and/or ports.

The network service provider 108 can obtain and update status information for any/all of the registered media processing devices 116. Such information can include, without limitation, one or more of a device status (e.g., on, off, active), a device location (e.g., as GPS coordinates reported by the device, by association with network resources, such as location within a particular wireless cell and/or attachment to a particular wireless access point. Determining a location can also include other techniques, such as identifying a router location, triangulation from a cell tower, bearing and/or distance estimates through generally understood techniques in radio systems.

In some instances, the network service provider 108 can establish and/or maintain an estimate of a user's presence. Techniques for establishing a user's presence are generally understood and can include activity of one or more of the user's devices 116, locations of the user's devices 116, self-reported information, user message routing, and so on.

The media server 102 is in communication with the network services gateway 112 of the network service provider 108. In some embodiments, the media server 102 can be in communication with one or more of the user devices 116, as described in more detail below.

Figure 2:
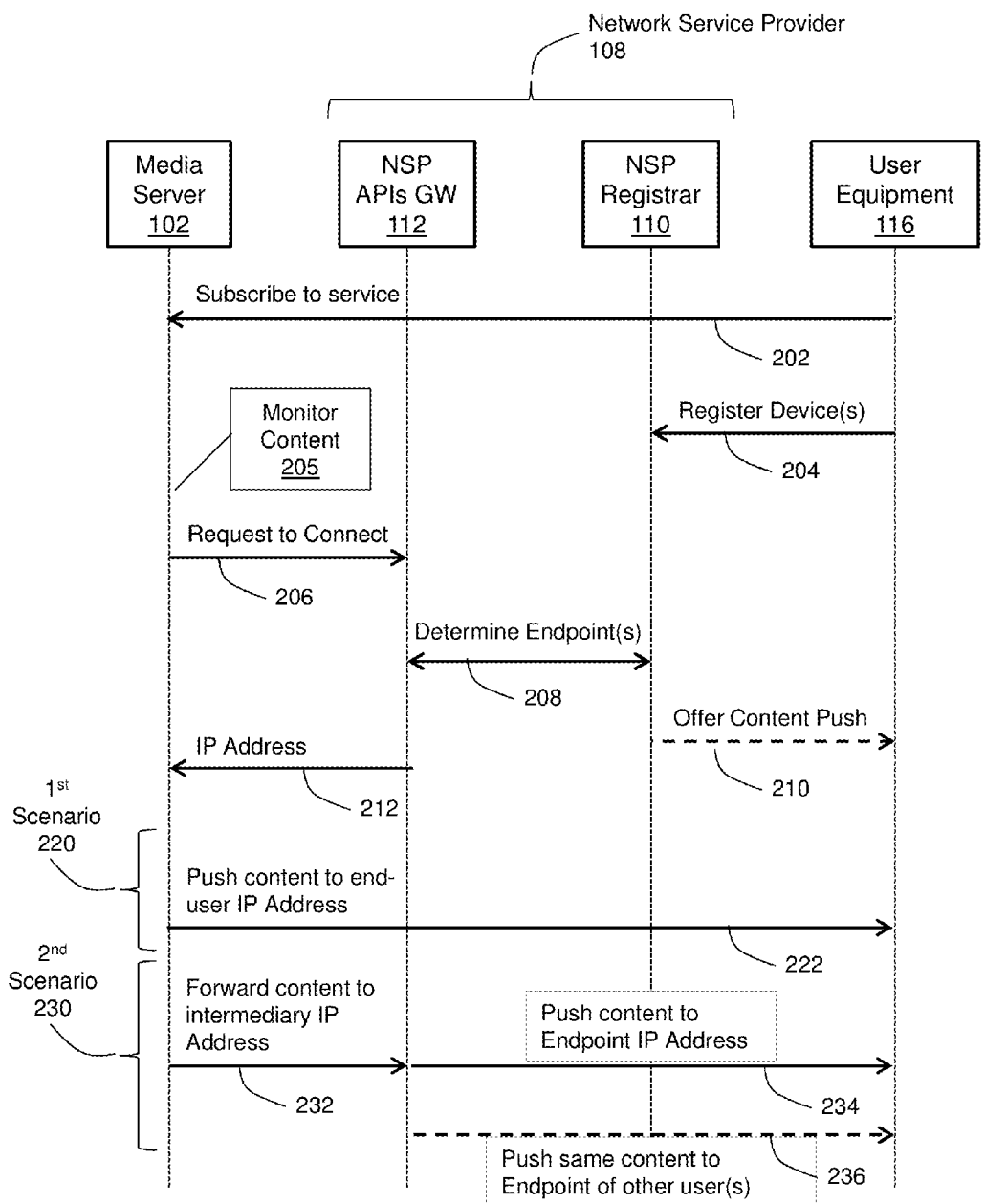
FIG. 2 depicts an illustrative embodiment of an example message exchange between the entities shown in FIG. 1.

FIG. 2 depicts an illustrative embodiment of an example message exchange 200 between the entities shown in FIG. 1. At 202, the media server 102 receives a subscription message from media processing equipment 116 of the user. It is generally understood that the subscription may occur one time, e.g., at an initial subscription to a media delivery service. It is also understood that although the message is shown as originating from the user devices 116 (FIG. 1), the message can originate from any suitable source. Other sources can include equipment of an employer, e.g., a work computer and/or telephone, equipment of another, e.g., a friend or colleague, and so on.

More generally, the message exchange at 202 can include updates to an existing subscription. Such updates can include selection and/or modification of the parameters 122 (FIG. 1). The parameter 122 can include criteria for media consumption, such as user preferences. By way of example, the user 114 (FIG. 1) can choose a particular event for delivery by way of the media service, such as a particular match of a championship tennis event. More general parameters 122 can include identification of news and/or weather alerts. The parameter(s) 122 might identify particular sources of such alerts, e.g., a particular network, such as ABC, CNN, or the Weather Channel, geographic locations, languages.

Alternatively or in addition to identifying media consumption criteria, the parameters 122 can include other preferences, such as preferred media processing equipment 116, e.g., to select among devices should more than one device be available at a time of delivery. Still other preferences can include media format, e.g., a preference for high-definition, when available, or a preference for small format and/or low resolution, e.g., when sensitive to data usage. The user might also identify calendar and/or times during which media content can be delivered, times when it should not be delivered, and/or particular sources of media content based on other parameters, such as device availability, schedule, time of day. Thus, parameters can indicate a preference for business related information, such as stock reports and news flashes to occur during normal business hours. Likewise, the parameters might indicate a preference for other content, such as entertainment, sports and the like for after hours.

At 204, the registration server 110 receives a registration message from media processing equipment 116 of the user. It is generally understood that the registration may occur one time, e.g., at an initial subscription to network services. It is also understood that although the registration message(s) 204 can include registration and/or updates to registrations of one or more of the individual user devices 116. Namely, when a mobile device is turned on and within range of service, the device can register with the registration server 110 directly through another network, such as a different mobile service provider network (not shown).

At 205, the media server 102 monitors one or more media content sources 104 to identify media content items to forward, push or otherwise offer to deliver to the user devices 116 based on the parameters 122. In some embodiments, a time and date of an occurrence of the media content item is generally unknown, at least according to a typical degree of specificity of regular programmed content. Thus, when a media content item is encountered or otherwise identified, the media server sends a request, at 206, to the network services gateway 112. The request can include a request to contact the user 114, who can be identified by any suitable means, such as the user's network service identifier 120 (e.g., phone number). In at least some embodiments, the media server does not identify any user devices 116 in the request 206, because it is unaware as to the existence, type and/or network destination of such devices. In response to receiving the request at 206, the network services gateway 112 identifies one or more user devices 116 currently available for receipt of the media content item.

For example, the network services gateway 112 requests registration information from the registration server 110. The registration information can identify all user devices 116 associated with the identified user 114. Alternatively or in addition, the registration information can identify only those user devices 116 that are available at that time for receipt of the media content. Such information might exclude user deices 116 that are turned off, and/or devices based on a presence state of the user 114. For example, if the request occurs during normal business hours, then the available devices might include the user's cell phone 116a, and office computer 116c, while excluding the user's tablet 116b, which might be turned off, and/or the user's home entertainment system 116d as it is unlikely the user would be present at home during business hours.

In determining the endpoints, one or more of the network services gateway 112, the registration server 110, or some other processing device, can determine which devices of currently available devices would be suitable, or best suited for the particular media content item. If the media content item is a radio broadcast, a call could be placed to the user's cell phone 116a. If it is video, then the media content item could be forwarded to the computer or tablet devices over the cell phone in favor of a larger display area, bandwidth availability, device processing and/or memory capacity, data usage charges, and so on. Thus, a WiFi connection to the tablet device 116b might be preferred over a mobile cellular transfer to the cell phone 116a.

Once the registered user device(s) 116 have been identified, the equipment of the network service provider 108 can determine an associated network address or endpoint. The endpoint can include an IP address of one or more particular user devices 116 and/or client(s) hosted on the user device(s) 116. Alternatively or in addition, the endpoint can include a similar address for another device, such as the network services gateway 112 that can be accessed by one or more of the user devices 116.

A network address can be provided to the media server 102, at 212. The network address can include a device address, such as an IP address of the identified end-user device according to a first scenario 220. Alternatively or in addition, the network address can include an address of a network element, such as a server or gateway device, as a second scenario 230, through which the media content can be distributed, routed or otherwise pushed to an end user device of the user equipment 116. Now having a destination address, the media server 102 can initiate forwarding or delivery the identified media content item, at 222, to the address. The delivery can occur whether the address corresponds to equipment of the network service provider 108 or some other entity, or to an identifier 118 or address of the user device(s) 116. In a first scenario 220, the media server 102 receives an endpoint address (e.g., IP address) of the user device. The media server 102 begins forwarding the media content item to the endpoint address. The media content item can be presented, automatically, upon receipt. Thus, a video content item can be streamed to the destination address and presented at the user device 116 by a streaming media client application resident on the device.

According to a second scenario 230, the media content item can be delivered or otherwise streamed to an intermediary network destination, such as the network services gateway 112. The intermediary, the network service provider 108 in this instance, can complete the delivery to the user's device(s) 116. In the illustrative example, the media server 102 forwards media content, at 232, to the network services gateway 112. The network service provider 108, in turn, delivers, at 236, the media content to the user device(s) 116.

In some embodiments, the intermediary network destination can differ depending on related criteria. For example, different ports of the network services gateway 112, or different servers altogether, can be determined according to one or more criteria. Such criteria can include an identity of the media services provider (e.g., wherein multiple media service providers independently monitor for content to the same and/or different end users). Other criteria can include a source of the media content, such as using different distribution addresses for different networks, e.g., ABC, CBS, CNN and so on. Still other criteria can include one or more of target audiences, media content format, identified end-user recipients, bandwidth capacity, network conditions, geographic locations, and the like.

Use of an intermediary can offer further isolation between the end user devices 116 and the media service provider. As the media content items can be delivered in an unsolicited manner, e.g., "pushed" to the user's device, some users may be hesitant about providing another entity with such access privileges to their devices 116. This could result from a fear that the access would be abused by the service provider pushing advertising or other unwanted media content. Users should be more inclined to trust their own network service provider.

Use of an intermediary address can offer other advantages, particularly for the network service provider 108. It is conceivable that in at least some instances, the media content item will be requested by other users. Consider users who have signed up for a service, such as an NFL "two-minute" service that pushes a multimedia stream of the final 2 minutes every/any an NFL football game or NBA basketball game. Subscribers of the same network service provider will likely be requesting the same service. Rather than stream high-bandwidth video to each user as an individual unicast presentation, the network service provider 108 can accept delivery at one or more common endpoints, such as the network services gateway 112. The network service provider 108 can then complete distribution to user devices 116 of multiple users in the most appropriate manner. Network service provider decisions in routing might direct content away from some servers having restricted capacity to other servers having excess capacity. Likewise, the network service provider 108 might direct multimedia streams away from network links having limited bandwidth to other links having excess bandwidth.

In some instances, the multimedia content item(s) can be routed according to technique known generally as Multimedia Broadcast Multicast Service (MBMS). Within LTE applications, this is referred to as Evolved MBMS (eMBMS). An eMBMS approach allows operators to control the service area to match an audience. For example, some broadcasts can be venue-specific, e.g., within a venue, such as a sports arena. The multimedia content can include rich media, multiple cameras, replays, statistics and so forth. Other applications can include region-specific broadcasts, e.g., for home team sporting events, local news events. Regional broadcasts might include weather, or breaking local news stories. Still other applications can include nation-wide broadcasts, such as major sporting events, play-off games, breaking national or international news stories.

In addition to the economies of scale, and efficient use of resources, such an eMBMS approach can offer other advantages. Consider an LTE context in which eMBMS transmissions are transmitted synchronously by multiple eNBs. Such transmissions occur within a single frequency network (MB-SFN), and provide for efficient signal combining at UE receivers to achieve a high operating SNR.

Figure 3A:
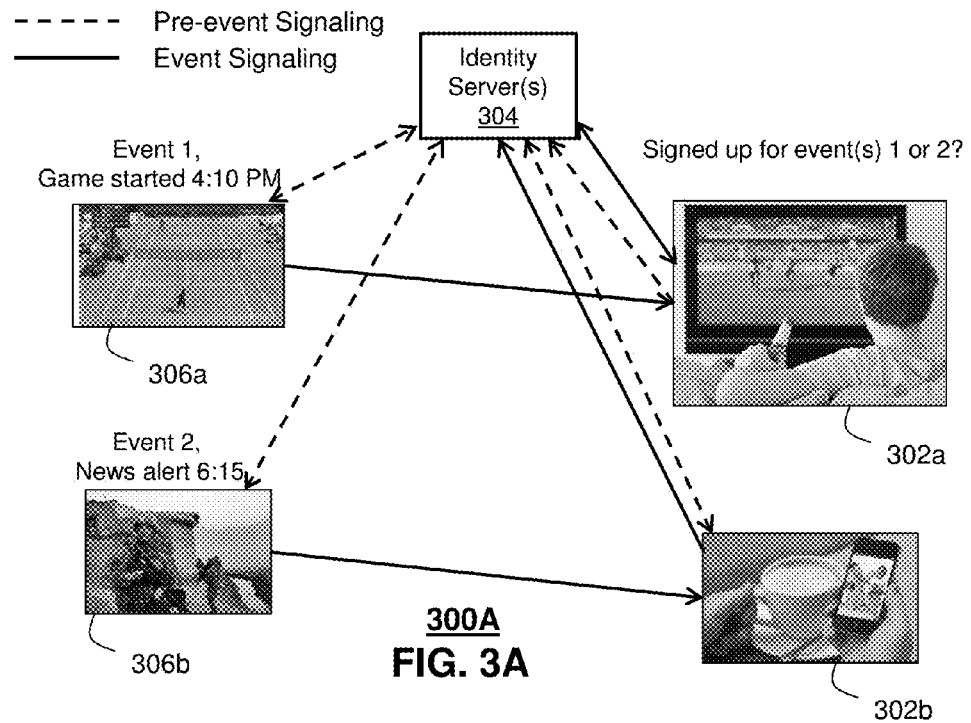
FIGS. 3A and 3B depict illustrative examples of implementations of the system described in FIGS. 1-2.
Figure 3B:
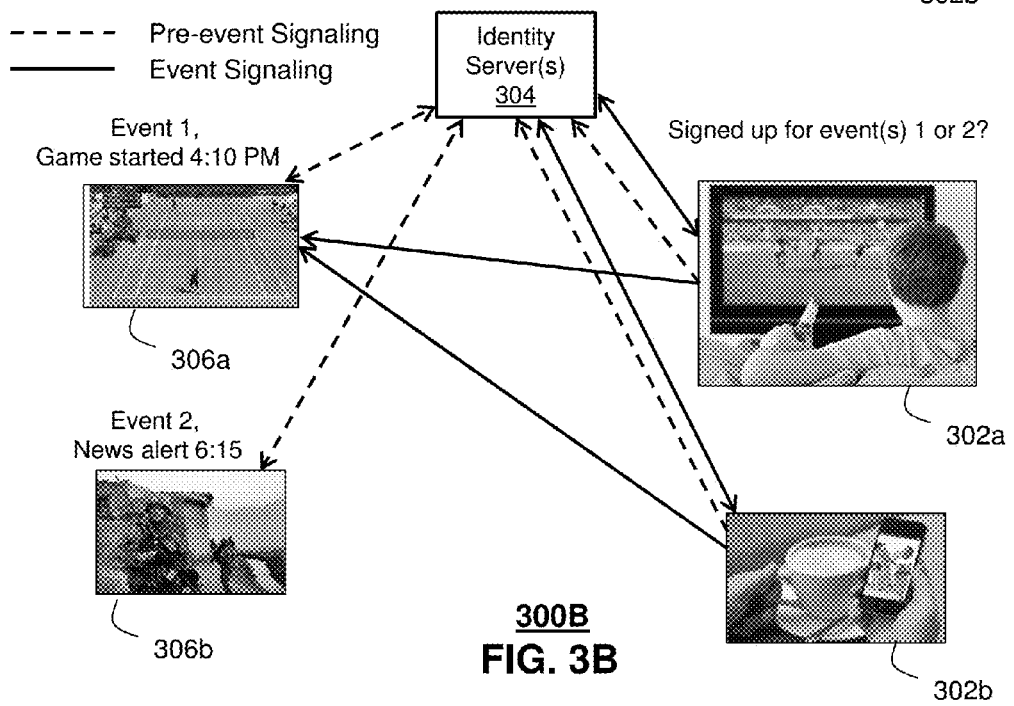

FIGS. 3A and 3B depict illustrative examples of implementations of the system described in FIGS. 1-2. In a first example 300A, a user has registered two devices, a home television 302a and a smart phone 302b with a network service provider. Registration of the devices can be accomplished by way of an identity server 304. The identity server 304 can be operated by the network service provider to facilitate provision of network services to the user. In this example, the user has pre-registered devices 302a, 302b with the network service provider and pre-identified topics of interest with a media service monitoring entity or provider. Identification of topics of interest included interest in receiving live feeds of a tennis match and of news alerts, in general. The media service provider monitors live media content sources. The monitoring can include a wide spectrum monitoring, e.g., all available channels/programs, and/or monitoring of some subset of available sources, such as those sources expected to offer the desired content. The media service provider identifies media contents for delivery to the user based on the identified interests of the user. Accordingly, when the media service provider identifies that a live streaming presentation of the tennis match has started, the media service provider requests a destination address from the identity server 304. The destination address is used to deliver or otherwise push the live streaming presentation of the tennis match to a registered device 302 of the user that is suitable for receiving and/or otherwise presenting the live streaming content.

In this instance, the identity server 304 provides an IP address of the user's television 302a. Having received the IP address, the media service provider causes the streaming media of the tennis match to be forwarded to the user's television 302a. In some instances, the user can be presented an offer 210 (FIG. 2), e.g., at the registered device(s) identified as destination addresses. To the extent the user accepts the offer, the media content is delivered to the destination address. In at least some embodiments, the offer can be issued from equipment of the network service provider, for example, from the identity server 304 and/or the gateway 112 (FIG. 1). To the extent that the user declines the offer, however, the media content is simply not delivered. Other features can be provided to allow a user to divert live media to a recorder, such as a DVR. Such re-direction requests can be initiated by the user at the time of receipt, whether or not the user was first offered to receive the content.

Likewise, at a later time, the media service provider identifies a news alert that it determines to be of interest to the user based on the user's identified preferences. Once again, the media service provider requests a destination address from the identity server 304. At this time, however, the user is away from the home entertainment center, but accessible by a smart phone 302b. The destination address of the smart phone 302b is provided by the identity server 304 to the media service provider. The media service provider follows up by forwarding the multimedia content item to the user's smart phone 302b. Delivery can include a media stream, e.g., unicast, a broadcast stream, e.g., multicast, eMBMS. The smart phone 302 renders and presents the multimedia content on its display. In this illustrative example, dashed lines are used to indicate activity, or signaling, that occurs during a pre-event phase, e.g., during registration and/or configuration. Likewise, solid lines are used to indicate activity, or signaling, that occurs during the event.

In a second example 300B (FIG. 3B), the user has also registered the same two devices, the home television 302a and the smart phone 302b with the network service provider by way of the identity server 304. In this example, the user has identified the same interests, such that the same events 306a, 306b are identified by the media service provider. A difference in this scenario is that the delivery technique is referred to as being "content centric." In content centric networking, content is emphasized by making it directly addressable and routable. Endpoints can communicate based on named data, rather than IP addresses. In this example, the media service provider determines that the tennis match has started. The user is notified by the identity server 304 at each of the available user devices 302a, 302b. In addition to being notified that multimedia content of the event is available (the live event is underway), the user equipment is provided with an address at which the multimedia content can be obtained. This address can be an original source, such as the source of the multimedia content. Alternatively or in addition, the address can be an address of the media service provider, e.g., a media streaming server operated by the media service provider, or an address of an intermediary device, such as an intermediary gateway or streaming server of the network service provider. In this scenario, the user devices 303a, 302b are directed dot the appropriate location to obtain the media content item.

A client application can be provided on one or more of the user devices 302a, 302b, to receive a destination address at which media content items can be obtained. The media content items are identified by the media service provider as disclosed herein. Upon receiving the destination address, the device client application obtains the streaming media and presents it as may be appropriate at the user device.

By way of non-limiting example, media content items can include one or more of video, audio, text, graphics, still images or photos and other forms of media, such as social media content, e.g., Facebook® social media, Linked In® social media, YouTube® media, SMS messages, MMS messages, Twitter® feeds.

Figure 4A:
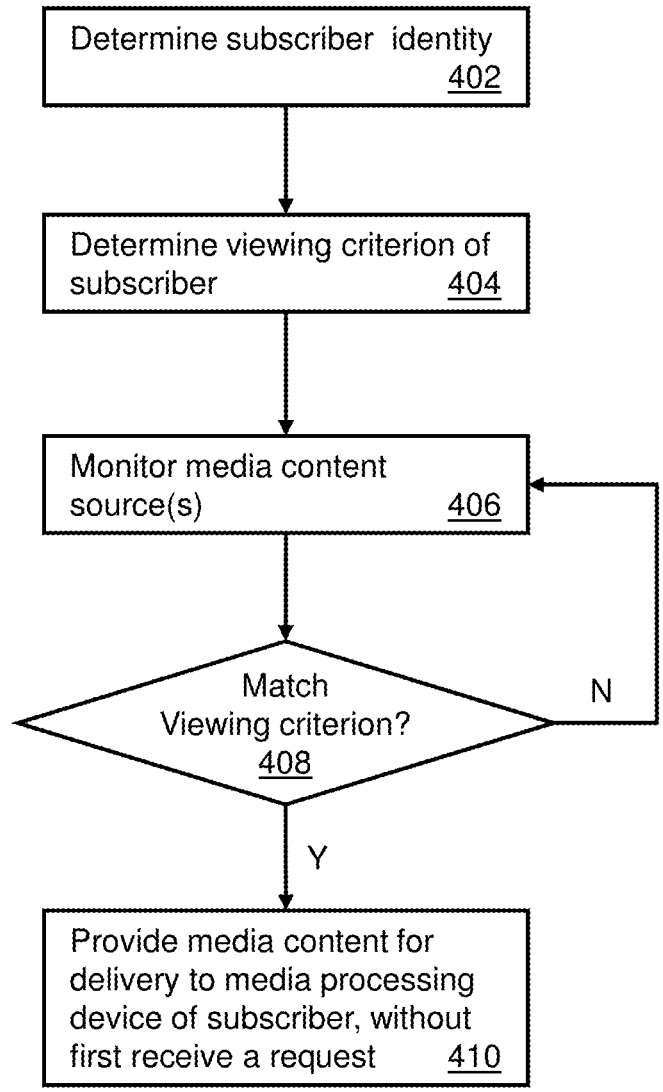
FIG. 4A-4B depict illustrative embodiments of a method used in portions of the system described in FIGS. 1-3A and 3B.

FIG. 4A depicts an illustrative embodiments of a process used in portions of the system described in FIGS. 1-3A and 3B. In particular, the process 400A can be implemented by equipment of a media service provider, such as the media server 102 (FIG. 1). A subscriber's identity is determined at 402. For example, a subscriber to a media service provider can provide an identity during an initial registration and/or update during a pre-event signaling.

A media consumption criterion established by the subscriber is determined at 404. In some embodiments, the subscriber can identify interests, topics, sources, or other criteria as may be relevant to identification of media content. In some embodiments, the subscriber accesses a Web page of the multimedia service provider and identifies such criteria and/or preferences by a series of selectable items. Such items can include pull-down menus, check-boxes, radio buttons, and the like. In some embodiments, interests are entered free form by writing and/or verbally. The media service provider can pre-process the preferences in order to determine a template or other suitable guide to be used in identifying media content items of interest.

Media content is generally monitored from one or more media sources at 406. The sources monitored can include default sources, such as network news channels, other new outlets, and/or sources identified based on the subscriber's identified criteria or preferences. That is, the media service provider can perform a pre-processing procedure to identify appropriate sources to monitor based on the subscriber's stated interests. It is conceivable that in at least some embodiments, the subscriber can identify one or more sources to be monitored. These sources can include publicly available sources, as well as personal sources of friends, family and/or peers. It is understood that access restriction information, such as passwords, user identity, etc., may be required before certain media sources can be searched.

It is worth nothing here that fees for a corresponding media delivery service can be established based on one or more measures. For example, a one-time registration and/or activation fee may be required. A recurring fee, such as a basic monthly fee can be assess to cover ongoing monitoring activity. The fees can vary depending upon the number of sources monitored, the volume of content monitored, and so on. In at least some embodiments, the fees can include a component related to the number of delivered multimedia content items, the volume of data of such items, times of day, source destination, delivery destination, delivery mode, etc.

To the extent a match is not determined at 308, the monitoring continues at 406. The monitoring may be ongoing and regular, e.g., according to a fixed and/or variable time period. The monitoring may be sporadic and/or focused based on a nature of the event. For example, if a finals match is expected at the Wimbledon, it is possible to monitor Wimbledon activity in a broad sense to have a general idea as to when the match might occur. This can include monitoring program guides, weather reports, progress of other events, such as other games or matches, the progress of particular individuals during such events, and so on. For example, in some embodiments, a subscriber might want to be interrupted to watch the finals match only if a particular player or list of players will be participating in the match. Thus, monitoring for the event might stop if a preferred player is knocked out before the finals. It is also conceivable that a period for monitoring might vary depending on such factors. Thus, if the finals match is expected to begin sometime between 1 pm and 2 pm, then monitoring might occur less frequently, or not at all before this time window, and more frequently during this time window.

The monitoring of media content sources can include monitoring metadata provided within the media stream. Such metadata can provide information, such as titles, genre, participants or actors, sources and so forth. Some of the metadata information can be descriptive, as in a summary or brief synopsis of the event. Alternatively or in addition, monitoring can include monitoring supplemental or ancillary data, such as program guides, listings, news bulletins, and so on. Monitoring can include interpreting textual information, subtitles, machine-readable information (e.g., bar codes, encoded data), audio and video. Audio can be interpreted with a speech to text service to produce textual representation of the audio for monitoring. In some instances the audio can be analyzed without interpreting text or speech, e.g., to identify a media item. Crowd noise can be indicative of a sporting event, musical scores of a produced media content item, and so on. Likewise, video can be interpreted with optical character recognition, e.g., to read subtitles, and/or with image recognition. For example, one or more video frames can be analyzed or otherwise interpreted alone or in combination with other such frames to identify a particular video item. Visual information can include colors, color pallets, shapes, motion, and so on.

To the extent that a match is determined between media content of the monitored media content sources and the viewing criterion at 408, the media content is provided for delivery. The media content is delivered at 410 to a media processing device of the subscriber. In particular, provision of the media content item for deliver is accomplished without first receiving a request for the multimedia content.

Figure 4B:
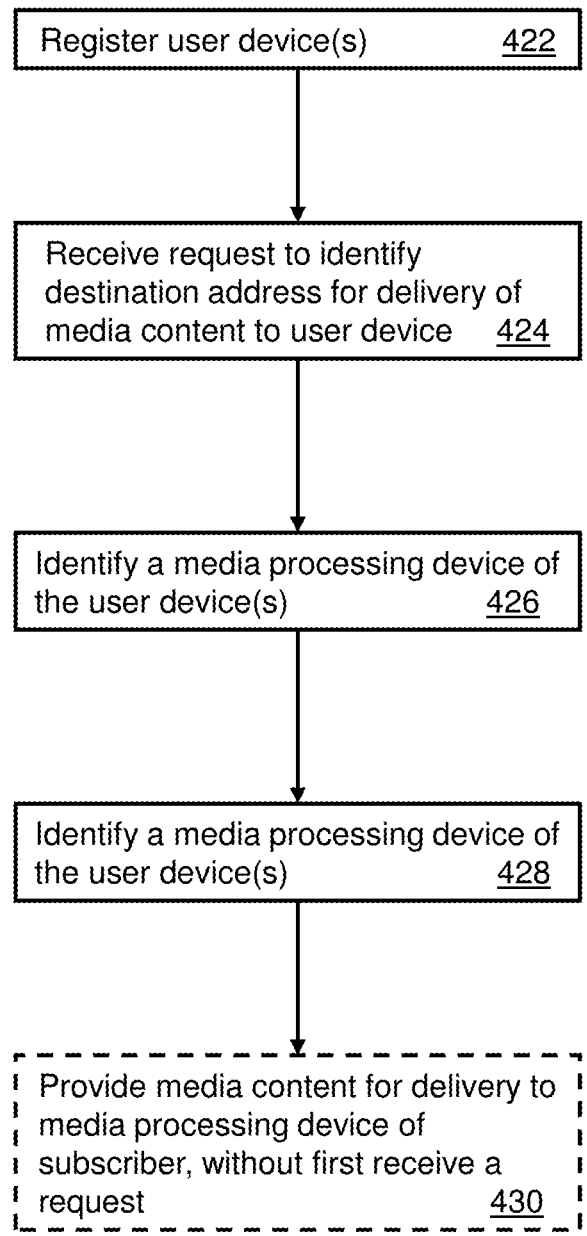

FIG. 4B also depicts an illustrative embodiments of a process used in portions of the system described in FIGS. 1-3A and 3B. In particular, the process 400B can be implemented by equipment of a network service provider, such as the gateway server 112 and/or registration server 110 (FIG. 1), or by equipment of some other third party. A device is registered at 422. For example, a subscriber might identify one or more devices during a registration process with the network service provider. Registration can occur coincident with registration for services, and/or with acquisition of new devices, and re-configurations of existing devices.

Registration of devices can also be accomplished automatically, e.g., by the network service provider in monitoring activity of pre-registered user devices. Thus, registration information, in addition to identifying all possible user devices, might also identify which devices are active, locations, usage status, etc. Such information can be useful in the distribution of multimedia content items according to the techniques disclosed herein.

A request to identify destination address for delivery of media content to user device is received at 424. The request can include some indicia as to the nature of the multimedia content as the destination address may vary depending upon device requirements, bandwidth, Quality of Service (QoS) requirements, and so on. The request can also identify a subscriber, e.g., by the subscriber's network identity. The network identity can include one or more of an email address, a telephone number, a residential address, an online name or handle, a username, and so on.

An identity of one or more media processing device is accomplished at 426. The identity of the media processing devices can be accomplished based on one of the user identity, devices registered to the user, capabilities of the registered devices, status of the registered devices, a nature of the multimedia content item to be delivered and combinations thereof. For example, equipment of the network service provider, such as the gateway 112 and the registration server can work in combination to determine suitable device(s). The registration server 110 receives an identity of the subscriber as well as a nature of the multimedia content item (e.g., audio, video, high definition, large format, duration). The registration server 110 can first identify all devices registered to the identified user. The registration server can then compare the nature of the media content item and the characteristics of each of the available user devices. Certain devices can be excluded as being unable or inappropriate for presentation of the media content item. An example would include the VoIP telephone 116e (FIG. 1) being unsuitable for video media content.

If more than one user devices are available, and suitable, a process can be implemented to determine a particular one of the available and suitable devices. Such a determination can be accomplished based on one device having characteristics that are better suited than another device. This might include one device having a larger screen being selected over a smaller screen for presenting video content. Alternatively or in addition, a selection can be based on a preferred hierarchy identified by one or more of the subscriber or the network service provider. For example, if a both a cell phone and television are available, the television can be identified as the preferred endpoint for delivery of the media content item. Such preferences can be based on one or more criteria, such as screen size, resolution, avoidance of cellular data usage/fees, stated preference, and so forth.

It is envisioned that in some instances, delivery of the media content item can be directed to more than one device of a user. This can include delivery to a user's mobile phone, e.g., when the user is not located at home, while also delivering the same media content item to the user's storage device for recording and presentation at a later, more convenient time. To this end, a user's presence information, including the user's presence or absence at an address, or the user's geolocation, can be used in determining the suitable device(s)

It is further envisioned, that in at least some embodiments, the media content item can be delivered to multiple devices, in tandem. That is, a video component can be pushed to one device, such as a television, while a corresponding audio component can be pushed to another device, such as a sound system. Other variants include, without limitation, determining and/or extracting textual content, e.g., from subtitles by optical character recognition, from metadata, from a third party source, and/or information from a second audio program (SAP).

In some instances, identification of a user device can include network activity, user calendar, observed user preference learned by observing user activity over a period of time. Such observational based decisions can be updated and refined or otherwise corrected over time. When presence state information is available, it too can be factored into the selection of a particular device to deliver the media content item. Thus, when a user is unavailable, a recording device 116f (FIG. 1) can be identified to receive the media content item for presentation at a later time. For instances in which none of the user's devices are available, another recording device can be identified, such as a network or cloud storage account of the user. It is also envisioned that available storage capacity can be used in determining suitability of a particular service device or service.

In some embodiments, the user receives an offer to receive the media content item at 427 (shown in phantom). The offer can be distributed to the identified devices, e.g., according to the identified destination addresses. To the extent the offer is declined, a message can be sent to the media service provider, at 429, declining delivery of the media content item, without providing any destination addresses.

To the extent the offer is accepted, or for situations in which no such offer is extended, a destination address is identified at 428 based on the identified media processing device and forwarded to the media service provider. The destination address can be obtained from network service provider records, from a third party, from the device itself, and so on. The media service provider can then use the information to deliver the media content item to the address of the identified media processing device. In some embodiments, the equipment of the network service provider provides an address associated with equipment of the media service provider, such as the gateway server 112. In such situations, the network service provider delivers the media content item at 430 (shown in phantom), to media processing device of subscriber, without first receive a request.

Figure 5:
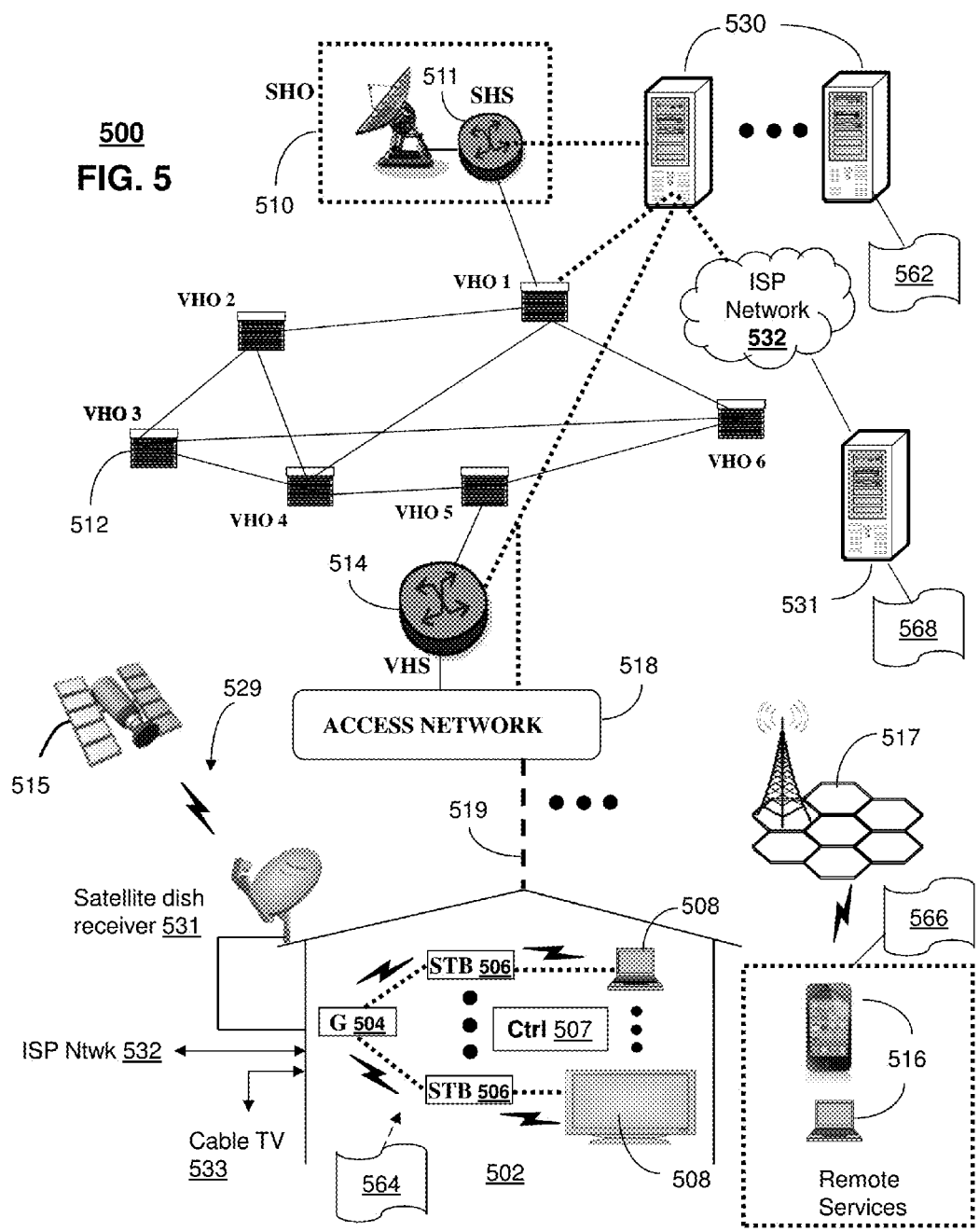
FIGS. 5-6 depict illustrative embodiments of communication systems that provide media services in relation to the media content delivery system of FIGS. 1-3A and 3B.

FIG. 5 depicts an illustrative embodiment of an example of a first communication system 500 for delivering media content. The communication system 500 can represent an Internet Protocol Television (IPTV) media system. It is worth noting here that the types of networks or network configurations disclosed herein are by no means intended to limit application of the inventive concepts. Namely, the particular network components disclosed herein, including core network(s) and/or subscriber access network(s) are offered merely as illustrative examples. Other architectures can include, without limitation, Web-based architectures, Session Initiation Protocol (SIP) architectures, and Real-time Transport Protocol (RTP) architectures, and so on. The communication system 500 can be overlaid or operably coupled with the systems of FIGS. 1-3A and 3B as another representative embodiment of communication system 500. For instance, one or more devices illustrated in the communication system 500 of FIG. 5 perform operations that determine an identity of a subscriber of a media service. A viewing criterion of the subscriber is determined and a media content item is identified based on the viewing criterion of the subscriber. The media content item is provided for delivery to a media processing device without first receiving a request for delivery of the media content item. The media processing device is identified by a network service provider based on a selection of the media processing device from among a number of devices of the subscriber that are registered with the network service provider. The selection of the media processing device is based on device capabilities and the identity of the subscriber.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more servers 530, a portion of which can operate as a web server for providing web portal services over the ISP network 532 to wireline media devices 508 or wireless communication devices 516.

Communication system 500 can also provide for all or a portion of the servers 530*a* to function as a registration server (herein referred to as registration server 530*a*), and as a gateway server (herein referred to as gateway server 530*b*). The registration and gateway servers 530*a*, 530*b* (generally 530) can use computing and communication technology to perform function 562, which can include among other things, techniques described by process 400B of FIG. 4B. For instance, function 562 of server 530*a* and server 530*b* can be similar to the functions described for servers 110 and 112 of FIG. 1 in accordance with method 440B. A media server 531 can be provisioned with software functions 564, to utilize the services of servers 530. For instance, function 564 of media server 531 can be similar to the functions described for the media server 102 of FIG. 1 in accordance with process 400A of FIG. 4A.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
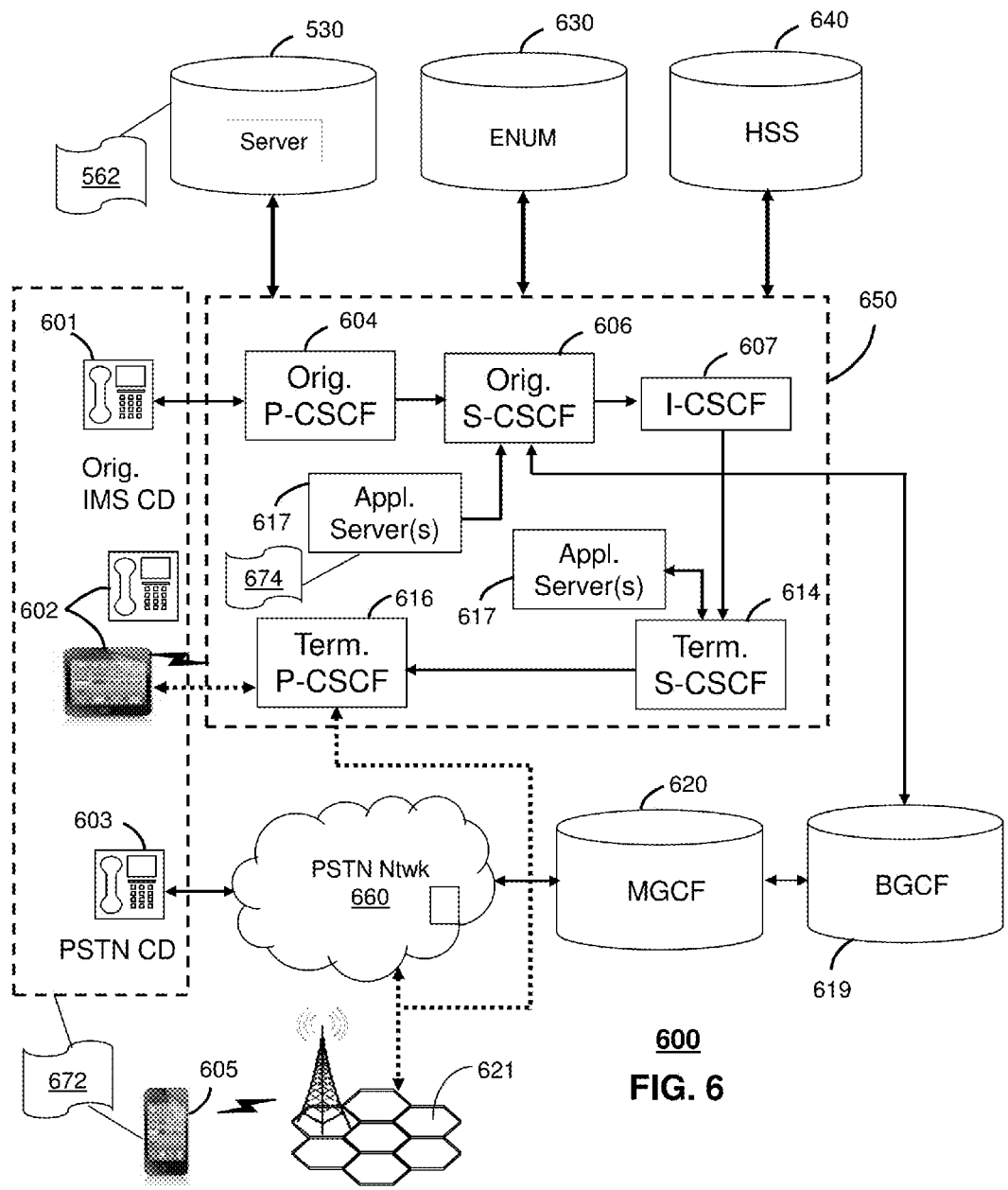

FIG. 6 depicts an illustrative embodiment of an example of a communication system 600 employing an IP Multimedia Subsystem (IMS) network architecture to facilitate the combined services of circuit-switched and packet-switched systems. Once again, it is worth noting here that the types of networks or network configurations disclosed herein are by no means intended to limit application of the inventive concepts. Communication system 600 can be overlaid or operably coupled with system 100, 300A and 300B of FIGS. 1, 3A and 3B and communication system 500 as another representative embodiment of communication system 500 to determine an identity of a subscriber of a media service. A viewing criterion of the subscriber is determined and a media content item is identified based on the viewing criterion of the subscriber. The media content item is provided for delivery to a media processing device without first receiving a request for delivery of the media content item. The media processing device is identified by a network service provider based on a selection of the media processing device from among a number of devices of the subscriber that are registered with the network service provider. The selection of the media processing device is based on device capabilities and the identity of the subscriber.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The servers 530 of FIG. 5 can be operably coupled to communication system 600 for purposes similar to those described above. The servers 530 can perform function 562 and thereby provide device identification and delivery services to the CDs 601, 602, 603 and 605 of FIG. 6, similar to the functions described for the servers 110, 112 of FIG. 1 in accordance with process 400B of FIG. 4B. The CDs 601, 602, 603 and 605 that can be adapted with software to perform function 672 to utilize the services of the servers 530. The servers 530 can be an integral part of the application server(s) 617 performing function 672, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
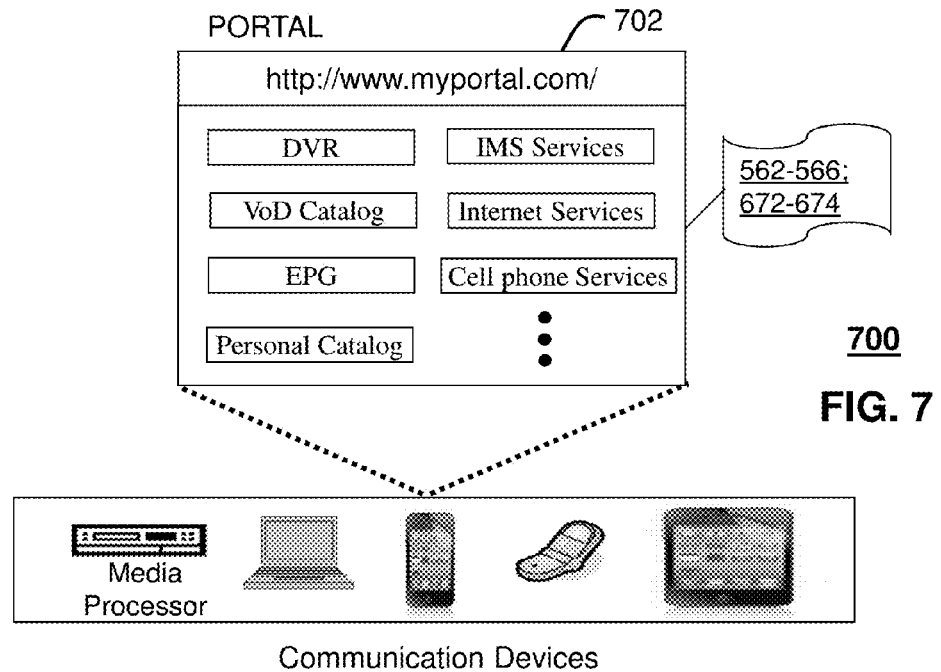
FIG. 7 depicts an illustrative embodiment of a web portal for interacting with the communication systems of FIGS. 1-3A and 3B.

FIG. 7 depicts an illustrative embodiment of a web portal 702 of a communication system 700. Communication system 700 can be overlaid or operably coupled with the systems 100, 300A, 300B of FIGS. 1, 3A and 3B, communication system 500, and/or communication system 600 as another representative embodiment of systems 100, 300A, 300B of FIGS. 1, 3A and 3B, communication system 500, and/or communication system 600. The web portal 702 can be used for managing services of systems 100, 300A, 300B of FIGS. 1, 3A and 3B and communication systems 500-600. A web page of the web portal 702 can be accessed by a Uniform Resource Locator (URL) with an Internet browser using an Internet-capable communication device such as those described in FIGS. 1, 3A and 3B and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-564 to adapt these applications as may be desired by subscribers and/or service providers of systems 100, 300A, 300B FIGS. 1, 3A and 3B, and communication systems 500-600. For instance, users of the services provided by server 531 or server 530 can log into their on-line accounts and provision the servers 110, 112, 102, 530 or server 531 with user profiles, preferences, media consumption criteria, user registrations, device registrations, provide contact information to server to enable it to communication with devices described in FIGS. 1-6, and so on. Service providers can log onto an administrator account to provision, monitor and/or maintain the systems 100, 300A, 300B of FIGS. 1, 3A and 3B or the servers 530, 531.

Figure 8:
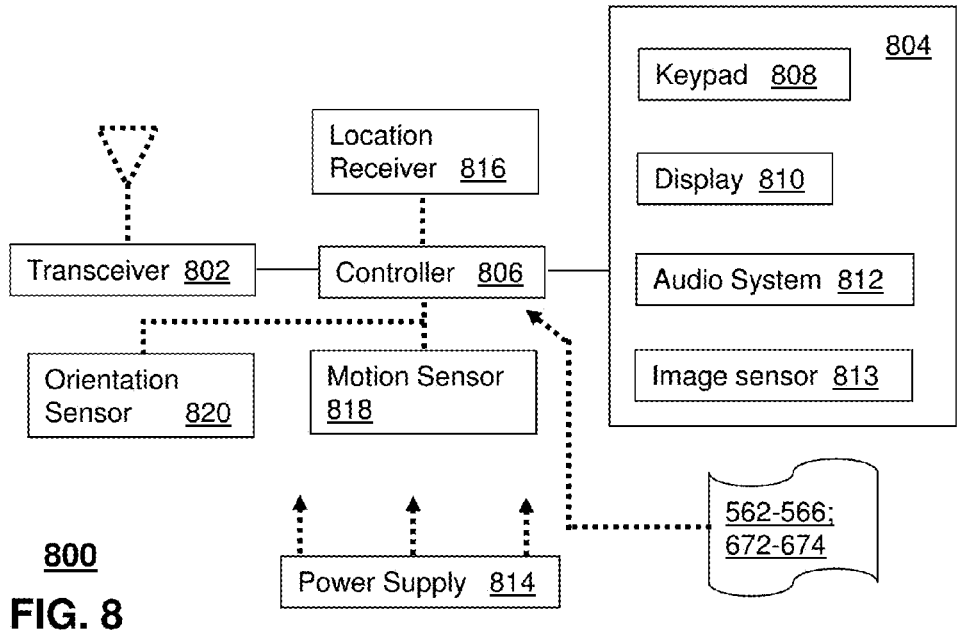
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-3A and 3B, and FIGS. 5-6. Communication device 800 in whole or in part can represent any of the communication devices described in FIGS. 1-3A, 3B and 5-6 and can be configured to perform portions of the processes 400A of FIG. 4A and/or 400B of FIG. 4B.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1-3A and/or 3B, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in the systems 100, 300A, 300B of FIGS. 1, 3A and 3B, communication systems 500-600 of FIGS. 5-6 such as a gaming console and a media player.

The communication device 800 shown in FIG. 8 or portions thereof can serve as a representation of one or more of the devices of FIGS. 1, 3A and 3B, communication system 500, and communication system 600. In addition, the controller 806 can be adapted in various embodiments to perform the functions 562-564, respectively.

Upon reviewing the aforementioned embodiments, it would be evident to an artisan with ordinary skill in the art that said embodiments can be modified, reduced, or enhanced without departing from the scope of the claims described below. In some embodiments, live media content is identified based on one or more parameters. For example, user may wish to receive media content relating to one or more topics of interest, but only if the media content meets one or more other criteria. By way of example, a user may wish to follow a sporting event based on other criteria, such as a particular point in the event, e.g., one of a particular inning, score, range of scores, score differential, change in score or combination thereof. This can be applied to a particular event or related events (e.g., an MLB championship series), more generally to a particular sport (e.g., golf), a number of different sports, or sports in genera.

Consider, a baseball game that is tied going into the $9^{th}$ inning. This can be identified as a media content item for push delivery to the subscriber, for example, if a user requested a broadcast of a particular baseball game and/or team event in which the score is tied and/or an occurrence of a $9^{th}$ inning. In this example, the subscriber will receive a presentation of the $9^{th}$ inning, whenever it happens to occur, and only if the score is tied. Such configurations likely to pique a user's interest can be identified by the user, e.g., during a setup or configuration. Alternatively or in addition, other services can be offered, such as broadcasting certain portions of certain events, such as heats or performances in a sporting event, heats or performances that include particular participants, teams, and so on.

In some embodiments, live media content can be identified based on one or more of viewer ratings, trending, social media chatter, or combinations thereof. For example, a user may wish to receive media content relating to one or more topics of interest, but only if indicia of other consumers, viewers and/or commentators on such media content meet one or more other criteria.

In some embodiments, if a media content item is identified as being of interest to a particular subscriber, but none of the registered devices of the user suitable for presenting the media content item are available at the time of presentation of the media content item, other actions can be taken. If registered device, such as a landline telephone, is the only registered user device available when the media content item is available, but unsuited for presenting a media content item, the device can be used to provide a user notification as to the availability of the media content item. In the illustrative example, an automated telephone call, voice message, short messaging service text message, and/or multimedia messaging service can be placed to the landline telephone informing the subscriber that the content was identified. Such notifications can include additional details, such as titles, times, sources, descriptions, lengths, and so on. Alternatively or in addition, the automated telephone call can been placed to a smart phone and/or simple cell phone.

The subscriber, upon receiving the message may choose to enable another device, such as a tablet or home set-top box to receive the identified multimedia content. In such situations, the media service provider and/or the network service provider can attempt to deliver the media content item to one of the other registered devices after some delay. The delay can be chosen to be sufficient to allow a user to activate one of the other registered devices. Alternatively or in addition, the media service provider and/or network service provider may receive a response from equipment of the user that the user is interested in receiving the media content item now or at a later time. The response can include an indication of another registered device to receive the identified media content item.

In some embodiments, one of the media service provider, the network service provider or some other third party provider, e.g., a user proxy device, can receive the media content item. This can occur, for example, when a registered device of a subscriber that is suitable for presenting the media content item is unavailable. Thus, the media content item can be directed to a DVR or suitable storage location. The subscriber can be provided with an indication that the media content item was stored and is available for viewing at a later time. The subscriber can receive such notifications on any of the registered devices, or by some other means, such as an email communication. Other embodiments can be used in the subject disclosure.

In other applications, it is understood that the media content can be obtained from a private entity, such as family, friend, or more generally, a peer. The other entity can broadcast, post or otherwise publish media content that is monitored by the media service provider. Upon determining that content is available from a preferred source, the media service provider in cooperation with the network service provider proceeds according to the various techniques disclosed herein to distribute or otherwise push the media content to the devices of the user. Consider a friend or family member on vacation that chooses to provide a real-time multimedia content (e.g., audiovisual) of some aspect of their vacation. The broadcast is live, as it happens and can be delivered or otherwise pushed to the recipient users. The recipient receives the multimedia content in real time, or near real time and can share a connection and enjoy some measure of spontaneity in sharing with their friend's/family member's experience.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
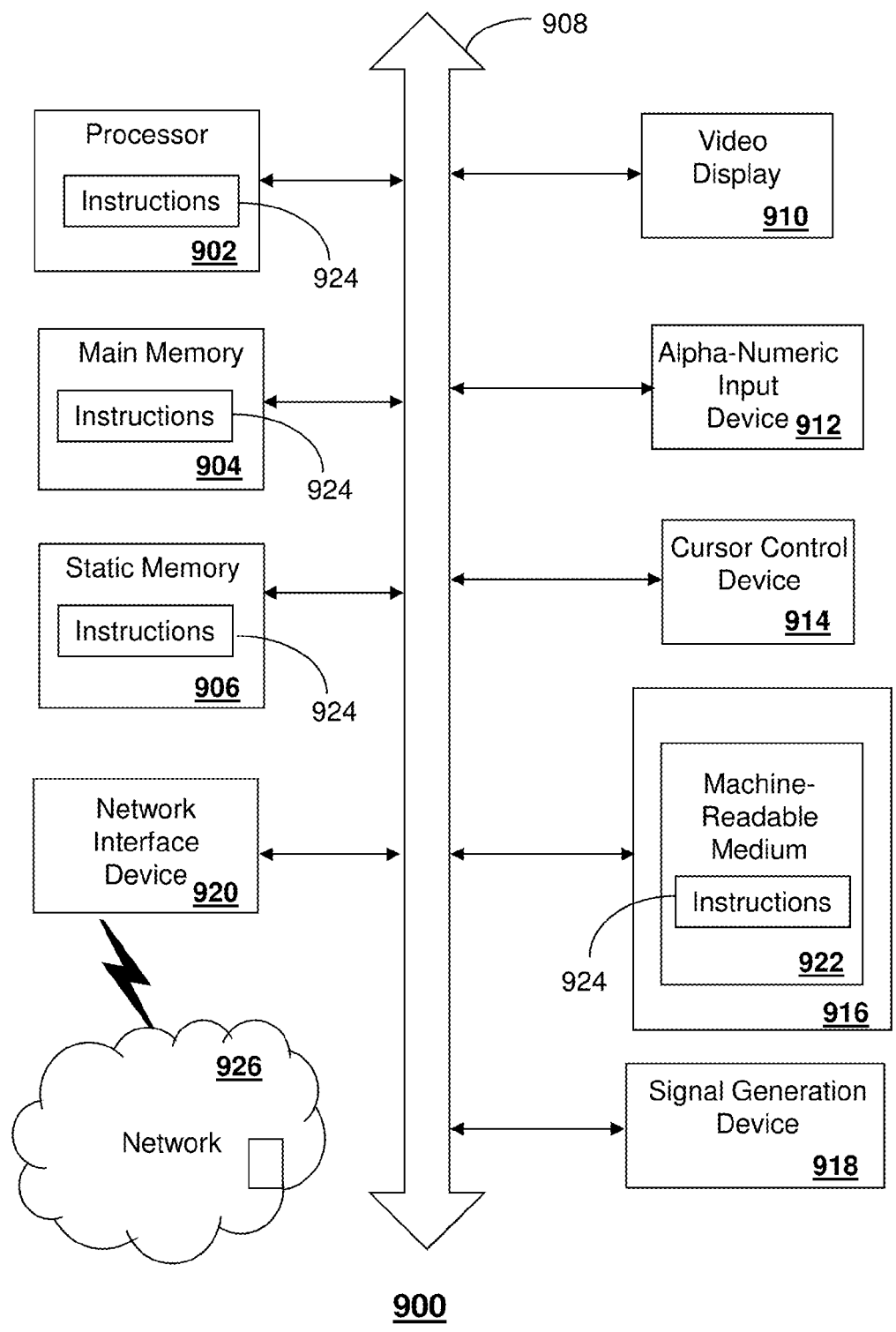
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the media server 102, the registration server 110, the gateway server 112 or the user devices 116 of FIGS. 1-2, the identity server(s) 304 or the user devices 302 of FIGS. 3A-3B, the user devices, the media processor 506 and other devices of FIGS. 1-3A and 3B. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A system, comprising:
a processing system including a processor; and
a memory that stores executable instructions that, when executed by the processing system, facilitate performance of operations, the operations comprising:
determining an identity of a user of a media service;
determining a media consumption criterion of the user;
identifying a media content item based on the media consumption criterion;

forwarding a request from a content provider service to an independent network service provider to access equipment of the user based on the identifying of the media content item;

obtaining a network address from the independent network service provider, wherein the network address is identified by the independent network service provider based on an identity of the user, wherein the independent network service provider selects a device from among a plurality of devices of the equipment of the user responsive to the request resulting in a selected device, wherein the plurality of devices have been pre-registered with the independent network service provider in association with the user, and wherein the device is selected based on device capabilities; and providing the media content item to the network address without requiring a request from the plurality of devices of the user, wherein the selected device obtains the media content item by way of the network address for presentation by the equipment of the user.

2. The system of claim 1, wherein the media content item comprises a live media content item.

3. The system of claim 2, wherein the identifying of the live media content item comprises:
monitoring a plurality of media content offerings of a plurality of media content sources;
correlating the plurality of media content offerings with the media consumption criterion of the user; and
identifying the live media content item based on the correlating of the plurality of media content offerings and the media consumption criterion of the user.

4. The system of claim 3, wherein the network address comprises one of an IP address of the selected device or an IP address of a port of a gateway that connects to a port on the selected device.

5. The system of claim 1, wherein the operations further comprise, determining the identity of the user based on a network identity associated with the user during a subscription by the user to the media service.

6. The system of claim 1, further comprising, providing the identity of the user responsive to identifying the media content item, wherein the obtaining of the network address is responsive to the providing of the identity of the user.

7. The system of claim 1, wherein the providing of the media content item to the network address is responsive to an indication of a user acceptance of an offer to receive the media content item.

8. A method, comprising:
determining, by a processing system including a processor, an identity of a subscriber of a media service;
determining, by the processing system, a viewing criterion of the subscriber;
identifying, by the processing system, a media content item based on the viewing criterion of the subscriber;
forwarding, by the processing system, a request to an independent network service provider to access equipment of the subscriber of the media service, based on the identifying of the media content item;
obtaining, by the processing system, a network address from the independent network service provider, wherein the network address is determined based on an identity of the subscriber and a selection by the independent network service provider of a media processing device from among a plurality of devices of the subscriber that are registered with the independent network service provider, wherein the selection of the media processing device is based on device capabilities and the identity of the subscriber; and
providing, by the processing system, the media content item for delivery to a media processing device without first requiring a request from the media processing device for delivery of the media content item.

9. The method of claim 8, further comprising:
obtaining, by the processing system, a network address to which the media content item can be provided; and
providing, by the processing system, the media content item to the network address, wherein the media content item comprises a live media content item, and wherein the media processing device obtains the media content item by way of the network address for presentation to the subscriber.

10. The method of claim 9, wherein the network address is an IP address,
wherein live media content occurs at an unscheduled time, and
wherein the identifying of the live media content item comprises:
monitoring, by the processing system, a plurality of media content offerings of a plurality of media content sources;
correlating, by the processing system, the plurality of media content offerings with the viewing criterion of the subscriber; and
identifying, by the processing system, the live media content item based on the correlating of the plurality of media content offerings and the viewing criterion of the subscriber.

11. The method of claim 10, wherein the IP address comprises one of an IP address of the media processing device or an IP address of a port of a gateway that connects to a port on the media processing device.

12. The method of claim 9, further comprising:
providing, by the processing system, the identity of the subscriber responsive to identifying the media content item, wherein the obtaining of the network address is responsive to the providing of the identity of the subscriber.

13. The method of claim 8, wherein the determining of the identity of the subscriber comprises receiving a network identity of the subscriber during a subscription to the media service, and wherein the providing of the media content item for delivery to the media processing device comprises forwarding, by the processing system, the media content item to equipment of the independent network service provider, wherein the equipment of the independent network service provider delivers the media content item to the media processing device.

14. The method of claim 8, providing, by the processing system, indicia of the media content item to the independent network service provider, wherein the device capabilities are determined based on suitability to the indicial of the media content item.

15. A non-transitory, machine-readable storage medium, comprising executable instructions that, when executed by a processor, facilitate performance of operations, comprising:
obtaining a criterion of a user;
determining an availability of previously unscheduled media content occurring at an unscheduled time based on the criterion of the user;
forwarding a request to an independent network service provider to access equipment of the user, based on the determining of the availability of the previously unscheduled media content;

obtaining a network address from the independent network service provider, based on a network identity of the user, to which the previously unscheduled media content be provided, wherein the network address is obtained from the independent network service provider, based on a selection of a device from among a plurality of devices of the user, the plurality of devices having been registered with the independent network service provider, wherein the selection of the device results in a selected device based on device capabilities and the network identity of the user; and providing the previously unscheduled media content to the network address without requiring a request from the plurality of devices, wherein the selected device obtains the previously unscheduled media content by way of the network address.

16. The non-transitory, machine-readable storage medium of claim 15, wherein the determining of the availability of the previously unscheduled media content comprises:

monitoring a plurality of media content offerings of a plurality of media content sources;

correlating the plurality of media content offerings with the criterion of the user; and identifying the previously unscheduled media content based on the correlating of the plurality of media content offerings and the criterion of the user.

17. The non-transitory, machine-readable storage medium of claim 16, wherein the previously unscheduled media content is live, and wherein the network address comprises one of a network address of the selected device or an network address of a port of a gateway that connects to a port on the selected device.

18. The non-transitory, machine-readable storage medium of claim 15, wherein the operations further comprise, determining the network identity of the user based on a network identity associated with the user during a registration of the user with the independent network service provider.

19. The non-transitory, machine-readable storage medium of claim 15, further comprising, providing the network identity of the user to the independent network service provider responsive to identifying the previously unscheduled media content, wherein the obtaining of the network address is responsive to the providing of the network identity of the user.

20. The non-transitory, machine-readable storage medium of claim 15, wherein the providing of the previously unscheduled media content to the network address is responsive to an indication of a receipt from the equipment of the user of an acceptance of an offer to receive the previously unscheduled media content.

* * * * *